J. Jochum,

Spring Scale.

No. 104,160.   Patented June 14, 1870.

Witnesses:

Inventor:
J. Jochum
PER
Attorneys.

United States Patent Office.

JOHN JOCHUM, OF BROOKLYN, NEW YORK.

Letters Patent No. 104,160, dated June 14, 1870.

IMPROVEMENT IN SPRING-SCALES.

The Schedule referred to in these Letters Patent and making part of the same.

To all whom it may concern:

Be it known that I, JOHN JOCHUM, of Brooklyn, in the county of Kings and State of New York, have invented a new and improved Net-weight Spring-Balance; and I do hereby declare that the following is a full, clear, and exact description thereof, which will enable others skilled in the art to make and use the same, reference being had to the accompanying drawing forming part of this specification.

This invention relates to improvements in spring-balances, whether having circular dials or straight scales on which the index fingers work, and consists in the application of an adjustable pointer or index finger, arranged to be set back to zero, after the "tare" has been placed on the scale, and indicate the net-weight only of the article placed in the vessel for containing it. Or, in case the dial or scale be arranged to move past a fixed finger, the said dials or scales are to be similarly adjustable.

Figure 1:
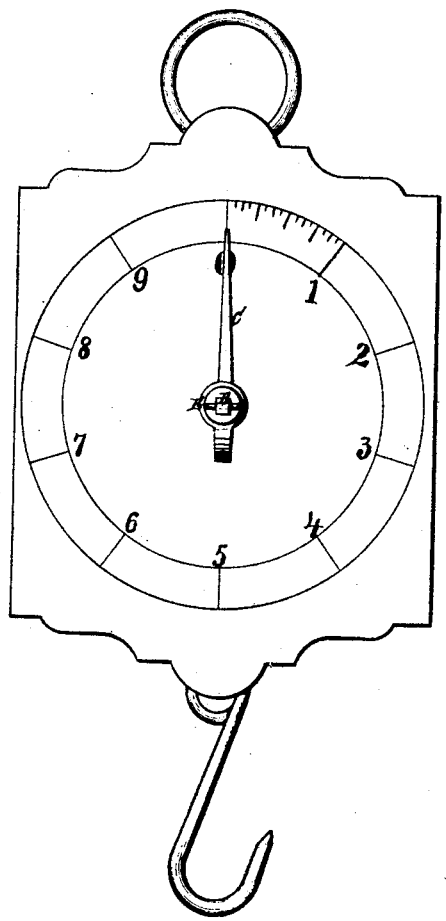
Figure 2:
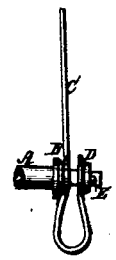

Figure 1 represents a front view of a spring-balance with a revolving index finger and circular scale, in which the index finger is made adjustable, as I propose, and Figure 2 is a detail view of the spindle and index finger, showing one arrangement by which the finger may be made adjustable.

A is the spindle;
B, a collar thereon;
C, the index finger;
D, a washer; and
E, a pin, for holding the washer and index finger on the spindle. The said index finger is doubled, for attachment to the spindle, which passes twice through it, and it is so shaped that the doubled part, which is elastic, bears at the parts through which the spindle passes against the collar and the washer with sufficient tension to produce friction, for holding the pointer at any point on the spindle where it may be set.

In the case of a straight spring-balance, where the index finger moves up and down along a straight scale, the pointer may be made to slide up and down on the part with which it is connected.

In using a scale arranged in this way, the vessel containing the substance to be weighed is placed on the scale, and the pointer is then, after being moved by the vessel, turned back to the zero mark, and thereby indicates, when the vessel and its contents are placed in the scale, the net-weight of the contents, as will be clearly understood.

I do not limit myself to any particular arrangement of the pointer to make it adjustable, as it may be arranged in various obvious ways.

Having thus described my invention,

I claim as new and desire to secure by Letters Patent—

The collared spindle A B, washer D, and pin E, combined with an elastic doubled finger C, each constructed and relatively arranged as and for the purpose described.

The above specification of my invention signed by me this 9th day of February, 1870.

JOHN JOCHUM.

Witnesses:
ALBERT E. MARQUISS.
GEO W. MABEE,